United States Patent
Stubbs et al.

(10) Patent No.: US 12,240,337 B1
(45) Date of Patent: Mar. 4, 2025

(54) VEHICLE AUXILIARY POWER SYSTEM

(71) Applicant: Lovis, LLC, Bloomington, MN (US)

(72) Inventors: Rustee Stubbs, Washington, UT (US); Matthew Peick, Eagan, MN (US)

(73) Assignee: Lovis, LLC, Bloomington, MN (US)

( * ) Notice: Subject to any disclaimer, the term of this patent is extended or adjusted under 35 U.S.C. 154(b) by 0 days.

(21) Appl. No.: 18/916,285

(22) Filed: Oct. 15, 2024

Related U.S. Application Data

(60) Provisional application No. 63/644,211, filed on May 8, 2024, provisional application No. 63/552,994, filed on Feb. 13, 2024.

(51) Int. Cl.
  *B60L 53/22* (2019.01)
  *B60L 50/12* (2019.01)
  *B60L 50/13* (2019.01)

(52) U.S. Cl.
  CPC ............... *B60L 50/12* (2019.02); *B60L 53/22* (2019.02); *B60L 2210/30* (2013.01)

(58) Field of Classification Search
  CPC .......... B60L 53/22; B60L 50/13; B60L 50/12; B60L 2210/30
  See application file for complete search history.

(56) References Cited

U.S. PATENT DOCUMENTS

| | | | |
|---|---|---|---|
| 6,223,546 B1 | 5/2001 | Chopko et al. | |
| 6,624,533 B1 | 9/2003 | Swanson et al. | |
| 6,742,343 B2 | 6/2004 | Matonog et al. | |
| 6,979,913 B2 | 12/2005 | Storm et al. | |
| 7,057,303 B2 | 6/2006 | Storm et al. | |
| 7,915,748 B2 | 3/2011 | Storm et al. | |
| 7,921,659 B2 | 4/2011 | Saborio | |
| 8,587,260 B2 * | 11/2013 | Kumar | B60L 7/06 320/155 |
| 8,776,928 B2 | 7/2014 | Stover, Jr. et al. | |
| 9,586,458 B2 | 3/2017 | Larson et al. | |
| 9,914,416 B2 * | 3/2018 | Bolger | B60R 16/033 |
| 10,240,847 B1 | 3/2019 | Thomas | |
| 10,279,688 B2 * | 5/2019 | Tokito | H01M 10/615 |
| 10,913,365 B2 * | 2/2021 | Tokito | B60L 9/18 |
| 10,995,760 B1 * | 5/2021 | Stubbs | F04D 27/001 |
| 11,050,241 B2 * | 6/2021 | Fisher | H01H 50/12 |
| 11,453,293 B2 | 9/2022 | Pugh | |

(Continued)

FOREIGN PATENT DOCUMENTS

| | | |
|---|---|---|
| DE | 102012005299 A1 | 9/2013 |
| EP | 3536552 A1 | 11/2019 |

(Continued)

*Primary Examiner* — Thai T Dinh
(74) *Attorney, Agent, or Firm* — Gurr & Brande, PLLC; Robert A. Gurr

(57) ABSTRACT

A vehicle auxiliary power system includes a generator configured to be mechanically coupled to a power takeoff (PTO) of a vehicle via an offset gearbox. The generator produces AC power that is delivered to one or more power connection interfaces capable of industrial use. In some examples, the AC power may be converted to DC power for use by DC electronic systems or for charging one or more batteries. The vehicle auxiliary power system may include charge controllers, ECMs/ECUs, and other computing systems. As a result, a user may have an on-demand high-power electrical supply without the need of a second engine.

14 Claims, 17 Drawing Sheets

(56) References Cited

U.S. PATENT DOCUMENTS

| | | | |
|---|---|---|---|
| 11,685,225 | B2 | 6/2023 | Stubbs |
| 12,036,871 | B2 | 7/2024 | Pugh |
| 12,088,131 | B2 * | 9/2024 | Herranz .................... H02J 7/02 |
| 2001/0020554 | A1 | 9/2001 | Yanase |
| 2006/0001318 | A1 | 1/2006 | Ahmad |
| 2006/0119325 | A1 | 6/2006 | Mrowiec et al. |
| 2006/0260304 | A1 | 11/2006 | Ishiwatari |
| 2011/0279070 | A1 | 11/2011 | Tanaka |
| 2012/0035815 | A1 | 2/2012 | Kawashima |
| 2015/0274098 | A1 * | 10/2015 | Bolger .................... B60L 50/16 |
| | | | 307/10.6 |
| 2017/0349078 | A1 | 12/2017 | Dziuba et al. |
| 2018/0106017 | A1 | 4/2018 | Huissoon |
| 2018/0222328 | A1 * | 8/2018 | Tokito .................... B60L 50/13 |
| 2020/0086744 | A1 | 3/2020 | Schumacher et al. |

FOREIGN PATENT DOCUMENTS

| | | |
|---|---|---|
| WO | WO2007011324 A1 | 1/2007 |
| WO | 2008085152 A1 | 7/2008 |
| WO | 2018226389 A1 | 12/2018 |

* cited by examiner

VEHICLE AUXILIARY POWER SYSTEM

CROSS-REFERENCE TO RELATED APPLICATIONS

This application claims the benefit of U.S. Provisional Ser. App. No. 63/552,994, filed on Feb. 13, 2024, and further claims the benefit of U.S. Provisional Ser. App. No. 63/644,211, filed on May 8, 2024, both of which are incorporated herein.

TECHNICAL FIELD

The present disclosure relates to auxiliary power supplies on a vehicle. More particularly, the present disclosure relates to using an internal combustion engine coupled to an onboard generator to generate auxiliary power.

BACKGROUND

Auxiliary power in vehicles is extremely useful. For example, there is often a need for power at remote worksites, campsites, military operations, disaster response sites, and other locations. Additionally, auxiliary power is convenient for regular vehicle users, who have needs for either DC or AC power at locations where grid power may not be readily accessible.

Attempts by the prior art to solve these problems have only resolved some of these problems. For example, a standard vehicle may include an AC outlet or DC outlet that is coupled to the alternator of the vehicle. Such outlets typically have a 400-watt maximum (with many standard vehicles having a 150-watt maximum) due to relying on the alternator for producing power, which thereby limits the available power for auxiliary electronics. Further, electric vehicles may have up to a 100-kwh battery that could supply, for example, 5 kw of power for up to 20 hours, but would then be fully depleted and need to be recharged. Further, for commercial vehicles (e.g., refrigerated diesel trailers, construction trucks, tanker trucks, etc.), typically a separate engine is used, such as an auxiliary diesel engine, to generate usable power, particularly when the truck engine is not running. Having an engine for the vehicle and a separate engine for auxiliary power is not economical, and in many cases, may not be practical.

Developments in the recent art, including those by at least one of the inventors of the current disclosure, have provided for electric power generation from a power takeoff (PTO) of a vehicle for use by some auxiliary systems. For example, U.S. Pat. No. 10,995,760 discloses a computer-controlled power takeoff driven motorized pump system, and U.S. Pat. No. 11,685,225 discloses a power takeoff-driven refrigeration system. While those disclosures advanced the art, limitations remain. For example, there remains a need for a system that is configured to generate high voltage, continuous power in standard industrial voltages and frequencies, while maintaining low idle speed of a vehicle. The present disclosure seeks to solve these and other problems.

SUMMARY OF EXAMPLE EMBODIMENTS

In some embodiments, a vehicle auxiliary power system comprises a generator coupled to a PTO via an offset gearbox. The offset gearbox provides for various configurations and alignments for the PTO to generator coupling, and may also provide additional gear ratios (e.g., 1:2). A power electronics enclosure is coupled to the generator for receiving AC power generated from the generator. Depending on the implementation, the power electronics enclosure is configured to output three-phase AC power in standard industrial voltages and frequencies, or DC power.

In some embodiments, an electronic control unit (ECU) monitors voltages, speeds, power, and safety. The ECU is configured to selectively activate or deactivate one or more components (e.g., generator, rectifier, etc.) of the system in response to a triggering event, such as receiving user input (e.g., locally or from an administrative computing system) or detecting a sensor reading that meets or exceeds a predetermined threshold or is outside of a predefined acceptable range. The ECU may also communicate with other vehicle systems via the CANbus, thereby controlling idle speeds or vehicle systems in response to user input or sensor readings.

In some embodiments, the vehicle auxiliary power system further comprises a user interface which may include on or more of speakers, displays, tactile output, projections, microphones, touchscreens, controllers, cameras, keyboards, stylus, mouse, or other pointer input, sensors of any type, and so forth. Sensor readings may be displayed to a user, such as available voltages, battery status (e.g., state of charge of auxiliary battery), generator temperature and status, etc. The system may also comprise various safety features, including insulation monitoring, override valves, high voltage interlock loops, welded contact detectors, etc.

BRIEF DESCRIPTION OF THE DRAWINGS

FIG. 14 illustrates a PTO override of a vehicle auxiliary power system;

DETAILED DESCRIPTION OF EXAMPLE EMBODIMENTS

Figure 1:
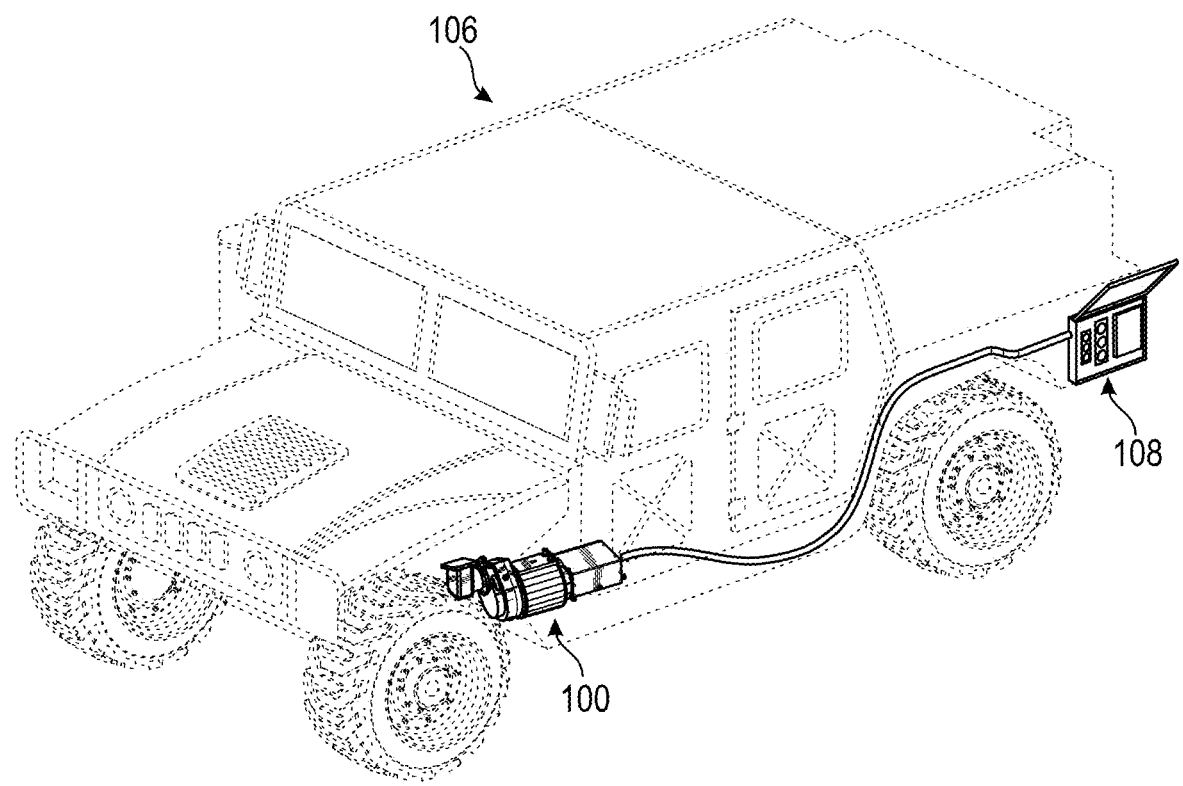
FIG. 1 illustrates a vehicle auxiliary power system on a vehicle.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a system of generating auxiliary power that is not limited by the vehicle alternator or batteries, and that does not require a separate engine, among other advantages. The vehicle auxiliary power system disclosed herein solves these and other problems.

Figure 2:
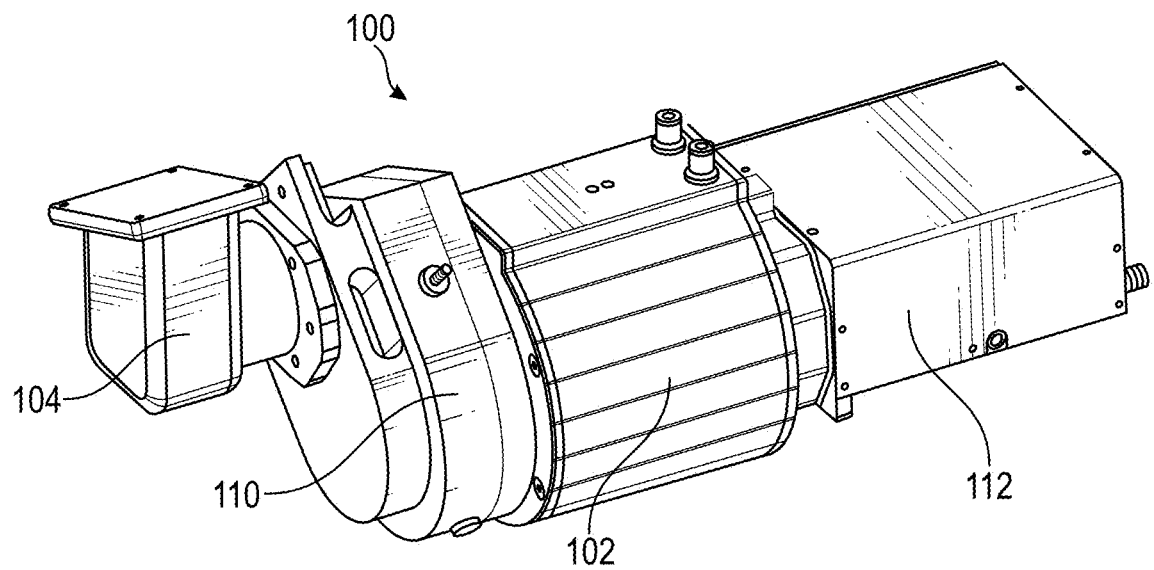
FIG. 2 illustrates a vehicle auxiliary power system configured for use on a vehicle.
Figure 3:
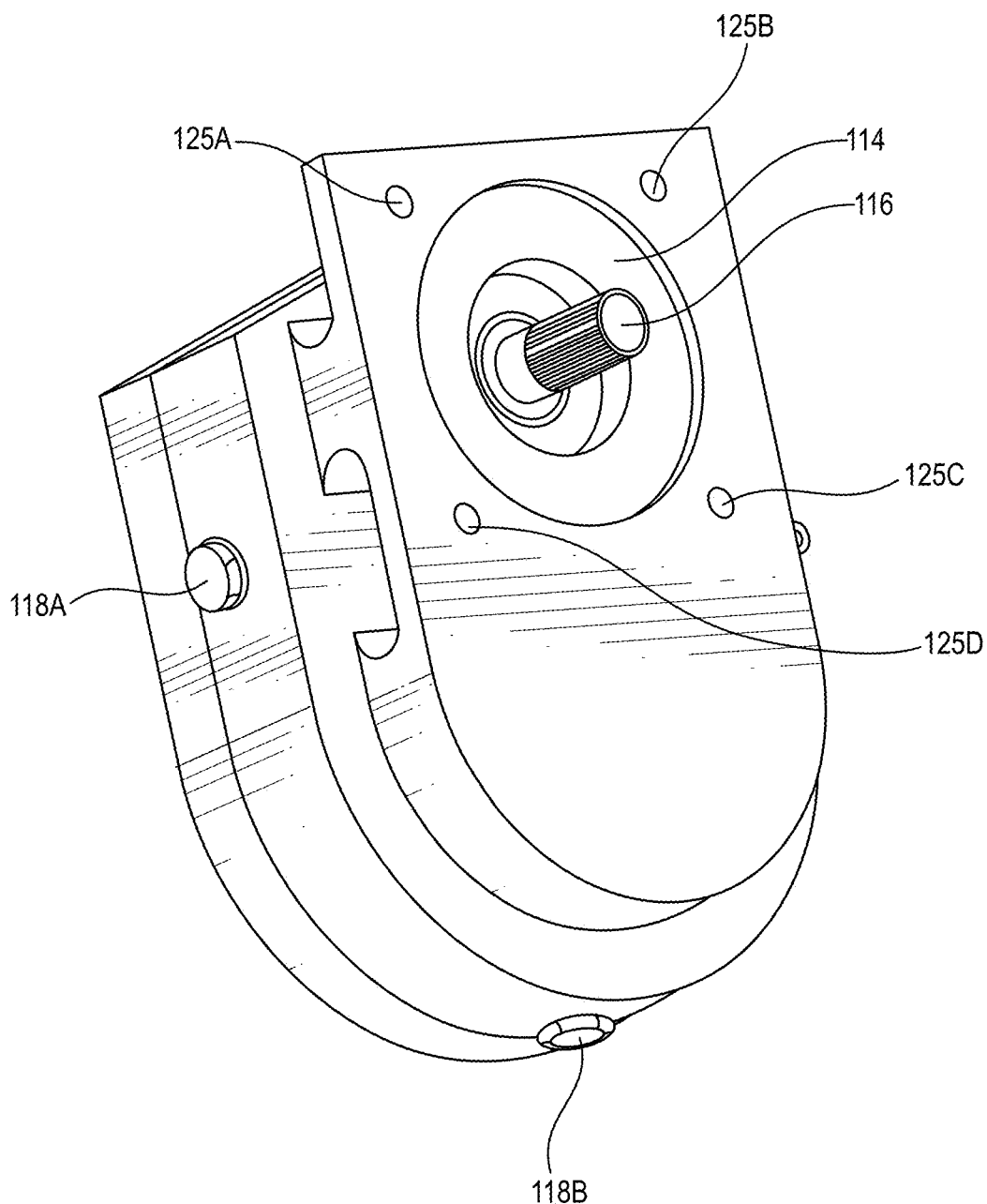
FIG. 3 illustrates a front perspective view of an offset gearbox of an auxiliary power system.
Figure 4:
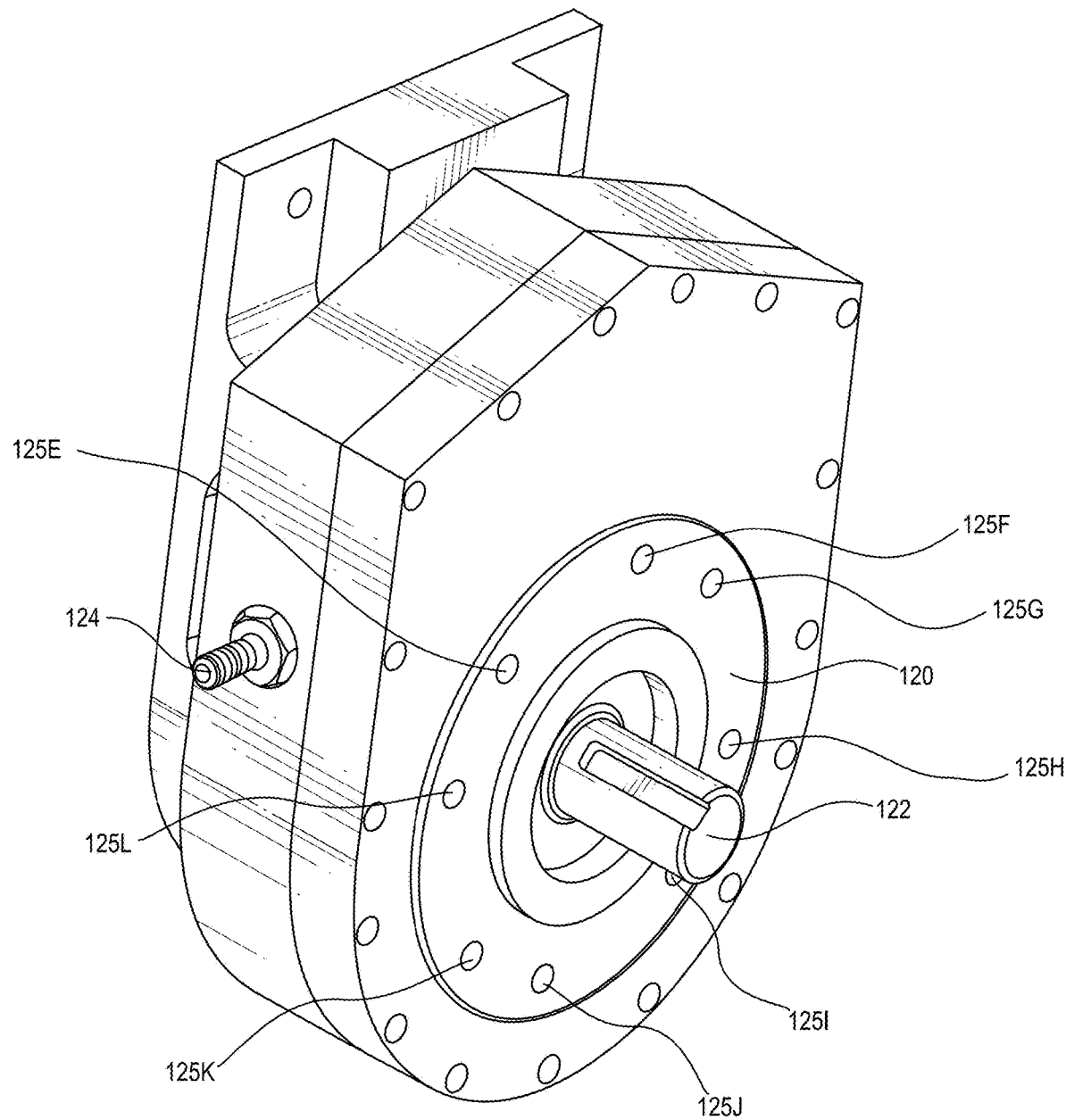
FIG. 4 illustrates a rear perspective view of an offset gearbox of an auxiliary power system.

In some embodiments, as shown in FIGS. 1-2, a vehicle auxiliary power system 100 comprises a generator 102 configured to be mechanically coupled to a power takeoff (PTO) 104 coupled to a vehicle 106. The PTO may be a standard commercial PTO available in the art. In some embodiments, the generator 102 may be a permanent magnet synchronous motor/generator with an encoder to generate three-phase power. However, it will be appreciated that any generator/reversible electric motor capable of being mounted to a vehicle and capable of producing common industrial power (e.g., 120v, 240v 208, 277v, 480v) may be used.

The auxiliary power system 100 further comprises a user interface 108 which may include one or more of speakers, displays, tactile output, projections, microphones, touchscreens, controllers, cameras, keyboards, stylus, mouse, or other pointer input, sensors of any type, and so forth. Sensor readings may be displayed to a user, such as available voltages, battery status (e.g., state of charge of auxiliary battery), generator temperature and operating status, system faults, etc. The auxiliary power system 100 may further comprise an integrated commercial isolation monitoring device/sensor to ensure high voltage isolation from vehicle low voltage.

The user interface 108 may be located in any number of locations, such as on the exterior of the vehicle 106 (as shown in FIG. 1), inside the cab of the vehicle 106, or may also be configured as a wireless device for receiving and transmitting information wirelessly, such as a smartphone or tablet that is wirelessly coupled (e.g., Bluetooth®, Wi-Fi®, or other known protocols) to the auxiliary power system 100. In such a scenario, a controller and wireless transceiver may be coupled to the generator 102 that is capable of sending and receiving data, as will be discussed in greater detail later herein. It will be appreciated that a user may transmit instructions, such as to activate or deactivate the generator 102, through the user interface 108, as will be discussed in more detail later herein.

Figure 5:
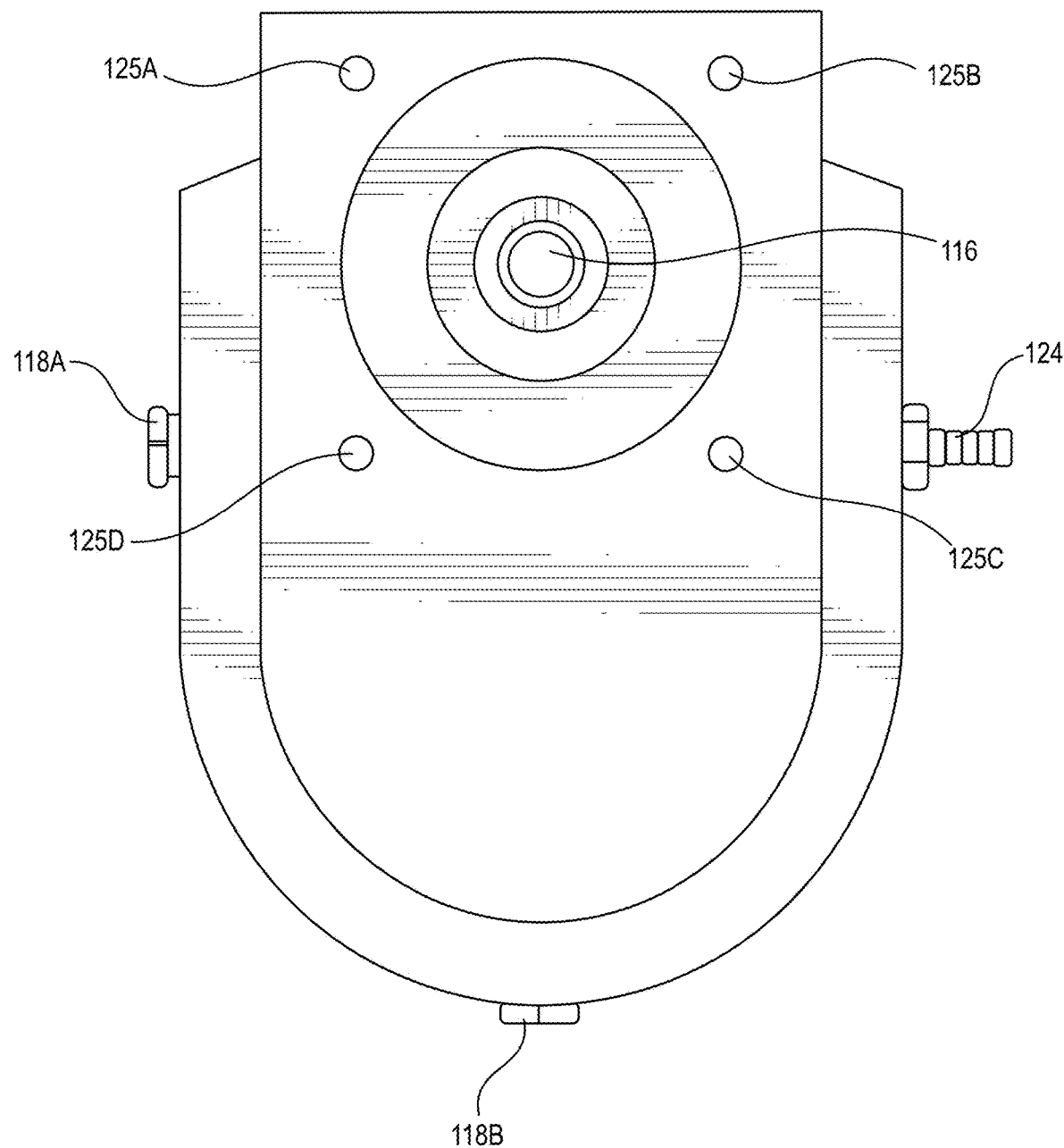
FIG. 5 illustrates a front elevation view of an offset gearbox of an auxiliary power system.
Figure 6:
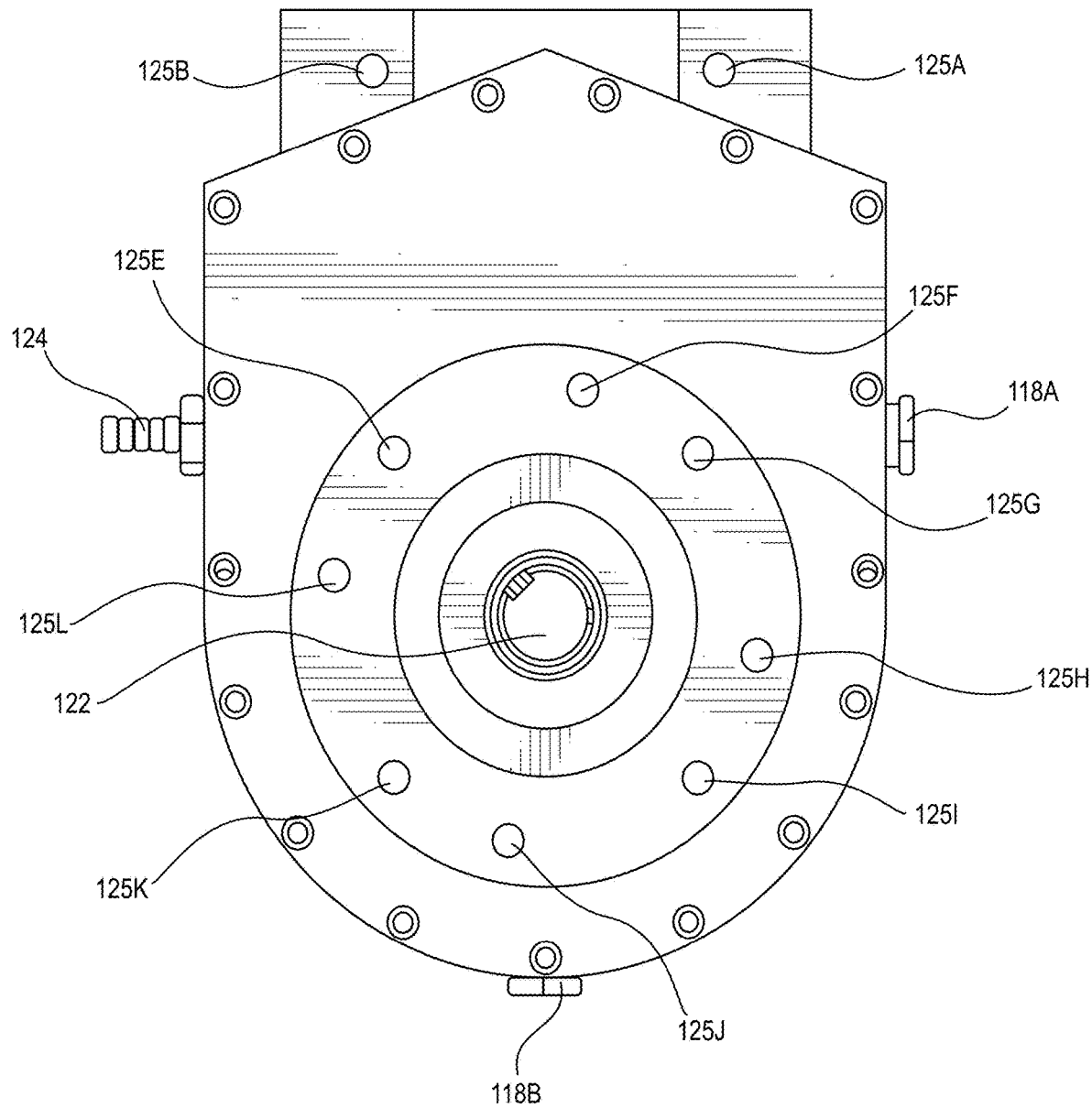
FIG. 6 illustrates a rear elevation view of an offset gearbox of an auxiliary power system.
Figure 7:
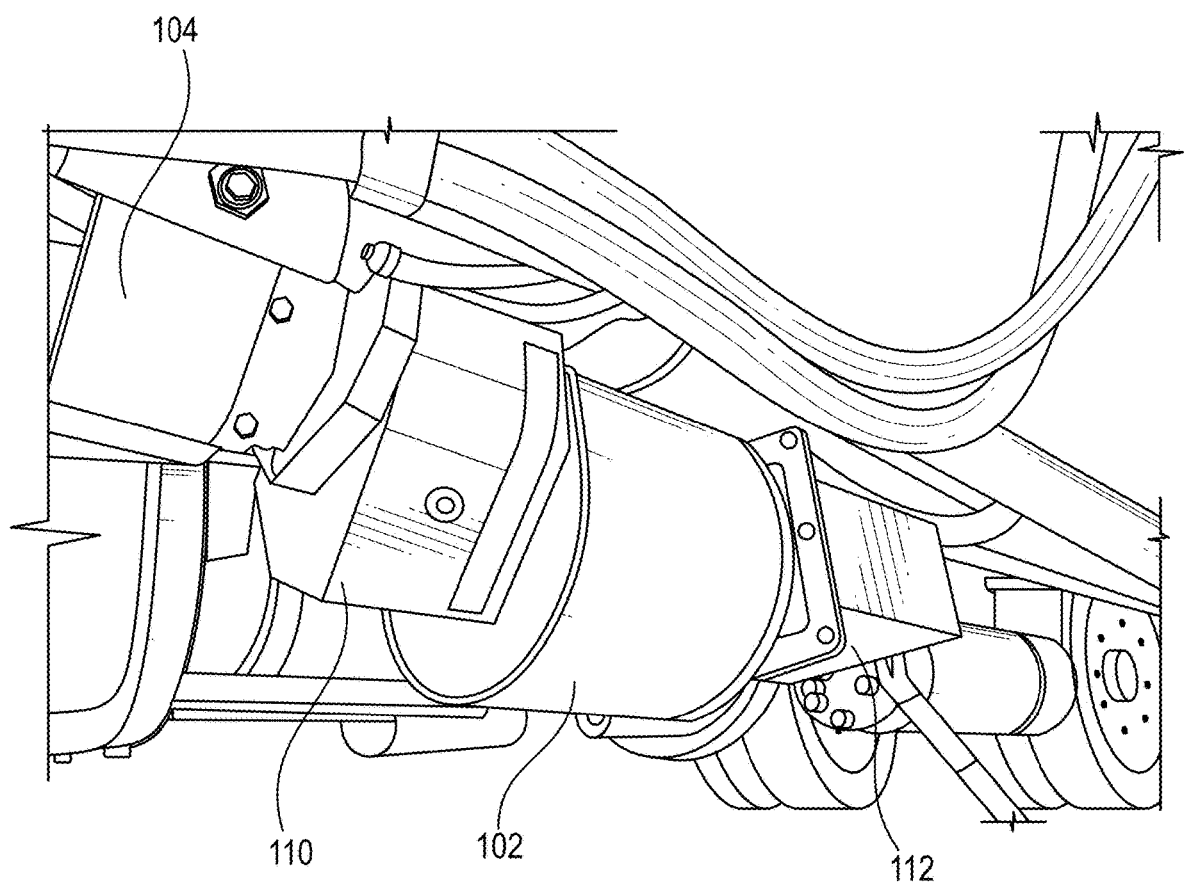
FIG. 7 illustrates a vehicle auxiliary power system mounted to a vehicle.

Referring to FIG. 2, the vehicle auxiliary power system 100 may comprise an offset gearbox 110 interposed between the PTO 104 and the generator 102, and a power electronics enclosure 112 coupled to the generator 102. Referring to FIGS. 3-7, the offset gearbox 110 allows for different mounting configurations of the generator 102 to the PTO 104, and further provides for additional gear ratios between the PTO 104 and the generator 102. The ability for adjustable mounting can be important in instances where the generator 102 would otherwise interfere with the transmission of the vehicle, but it also allows a user to alter the configuration to their desired placement. FIG. 7 shows an example of the vehicle auxiliary power system 100 installed on a vehicle 106. As shown, the offset gearbox 110 allows for proper alignment without interfering with the transmission of the vehicle 106.

Further, adjusting the gear ratio may be desired as well. For example, the generator 102 may need to operate at 2500 RPM to accomplish a user's needs. However, when the vehicle is running at 1000 RPM, the PTO may only be capable of 1250 RPM. In other words, using a 125% PTO with a vehicle idling at 1000 RPM produces an output of 1250 RPM, which is not sufficient for the generator 102 needing 2500 RPM. This may be solved using the offset gearbox 110 with a gear ratio of 1:2. In this scenario, the PTO RPM of 1250 is doubled using the offset gearbox 110, thereby reaching 2500 RPM for use by the generator 102.

It will be appreciated that other PTO gear ratios may be used without departing herefrom. In such use cases, the offset gearbox can still compensate for the difference using its gear ratios. By utilizing the offset gearbox 110, the vehicle auxiliary power system 100 is capable of generating in excess of 100 kw, with all common industrial power configurations being operable (120v, 240v 208, 277v, 480v). The power and frequency can be controlled through direct CANbus communication, via the power electronics enclosure 112, with the vehicle to thereby change idle speed, and thereby the RPM of the generator 102.

Referring back to FIGS. 3-4, the offset gearbox 110 comprises a PTO mounting face 114, a PTO input shaft 116, one or more oil fill and drain ports 118A-B, a generator mounting face 120, a generator input shaft 122, and one or more breather ports 124. FIGS. 5-6 illustrate various mounting holes 125A-D for the PTO 104 on a first side, and various mounting holes 125E-L on a second side for mounting to the generator 102. By using a plurality of mounting holes 125A-L, a user may customize the placement of the generator 102 in relation to the PTO 104. In other words, a user may pivot the offset gearbox 110 in relation to the PTO 104, coupling them with the mounting holes 125A-D, with the generator 102 then being coupled to the various mounting holes 125E-L, thereby forming the "offset" from the PTO 104.

As noted earlier, in some embodiments, the offset gearbox 110 comprises a two-gear gearset. However, it will be appreciated that other gearsets may be used without departing herefrom. Further, the offset gearbox 110 may use a 75-90 weight full-synthetic gear oil to lubricate and cool the gears, although such examples are not to be considered limiting and other weights and lubricants may be used. The breather port 124 and a breather tube may be used to vent the gearcases.

Figure 8:
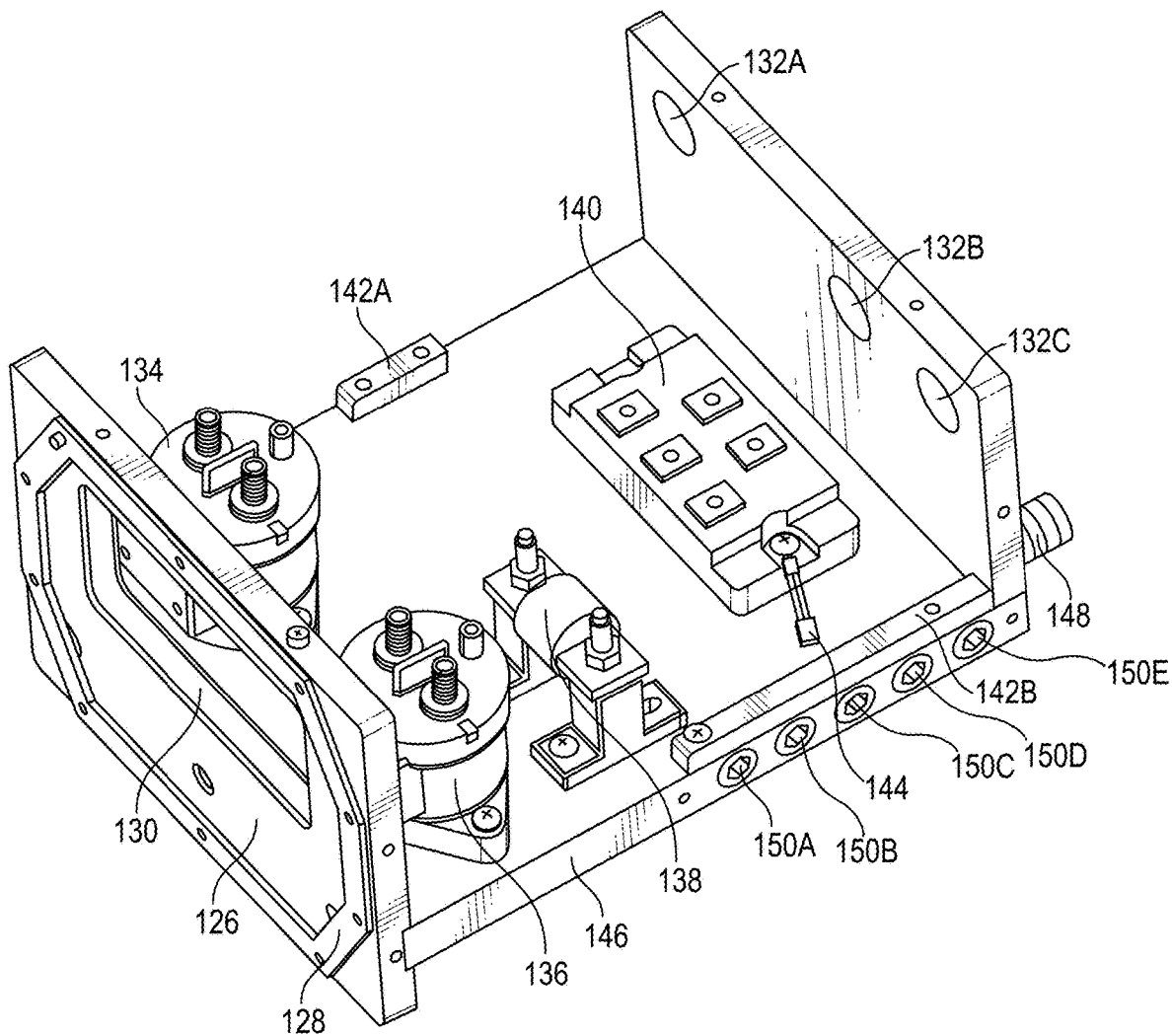
FIG. 8 illustrates a power electronics enclosure of a vehicle auxiliary power system.

FIG. 8 illustrates a power electronics enclosure 112, in some embodiments. The power electronics enclosure 112 is configured to couple to the generator 102, such as by bolting a front mounting plate 126 of the power electronics enclosure 112 to the generator 102 using a watertight gasket 128 (although other mechanisms may likewise be used). Three phase AC cables and sensor cables (e.g., generator temperature sensor cable) pass from the generator 102 and into the power electronics enclosure 112 via a wire aperture 130 in the front mounting plate 126. One or more apertures 132A-C positioned at the rear of the power electronics enclosure 112 allow for a multi-conductor signal cable, high voltage positive DC wire, and high voltage negative DC wire to exit the power electronics enclosure 112. It will be appreciated that other wires/leads may also pass through the apertures 132A-C, such as AC leads and signal lines.

The power electronics enclosure 112 further comprises, in some embodiments, a DC negative contactor 134, a DC positive contactor 136, a DC fast blow fuse 138, and an AC to DC rectifier 140 (or other converter/circuit system suitable for converting AC power to DC power). It will be understood that the DC negative and positive contactors 134, 136 allow the power to be turned on or off for application specific use and for safety. In some embodiments, the contactors 134, 136 comprise an extra set of contacts that will detect "welded contacts." In other words, if the contacts become exposed to excessive current, the contacts can become welded shut and not capable of opening. A separate set of contact wires feed from the respective contactor 134, 136 to an ECU 137 and signal when a welded contact occurs. If a welded contact occurs, a fault signal will be transmitted from the ECU 137 (or other controller) to an interlock device to cut power from the PTO 104 and generator 102. Further, the DC fast blow fuse 138 (or other fuse/breaker) provides overcurrent protection for the system. While the ECU 137 is illustrated in a control system 152 (FIG. 15B), it will be appreciated that it may be in any number of locations, including, in some embodiments, the power electronics enclosure 112.

Figure 9:
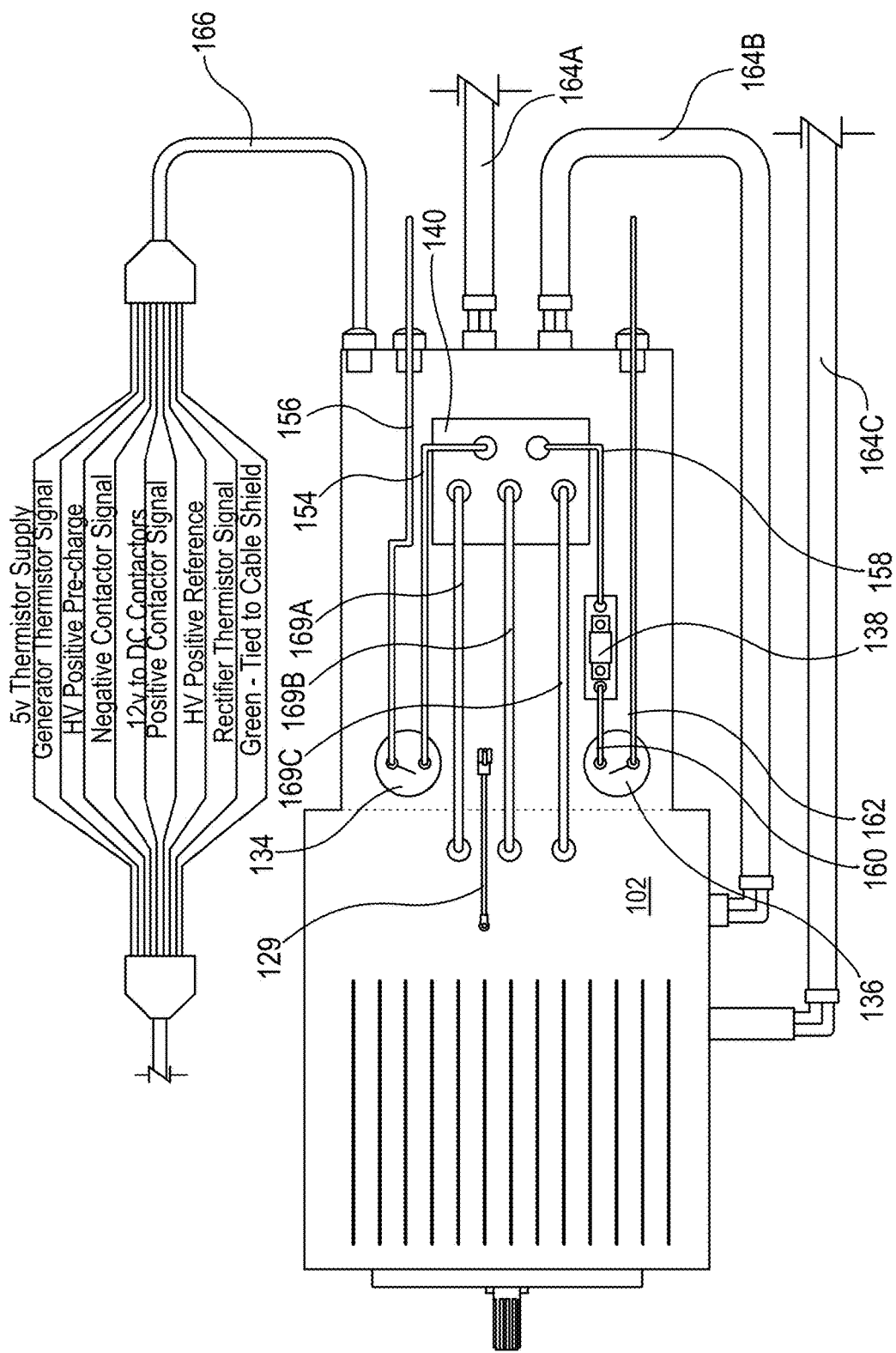
FIG. 9 illustrates a wiring diagram for DC applications using a vehicle auxiliary power system.
Figure 10:
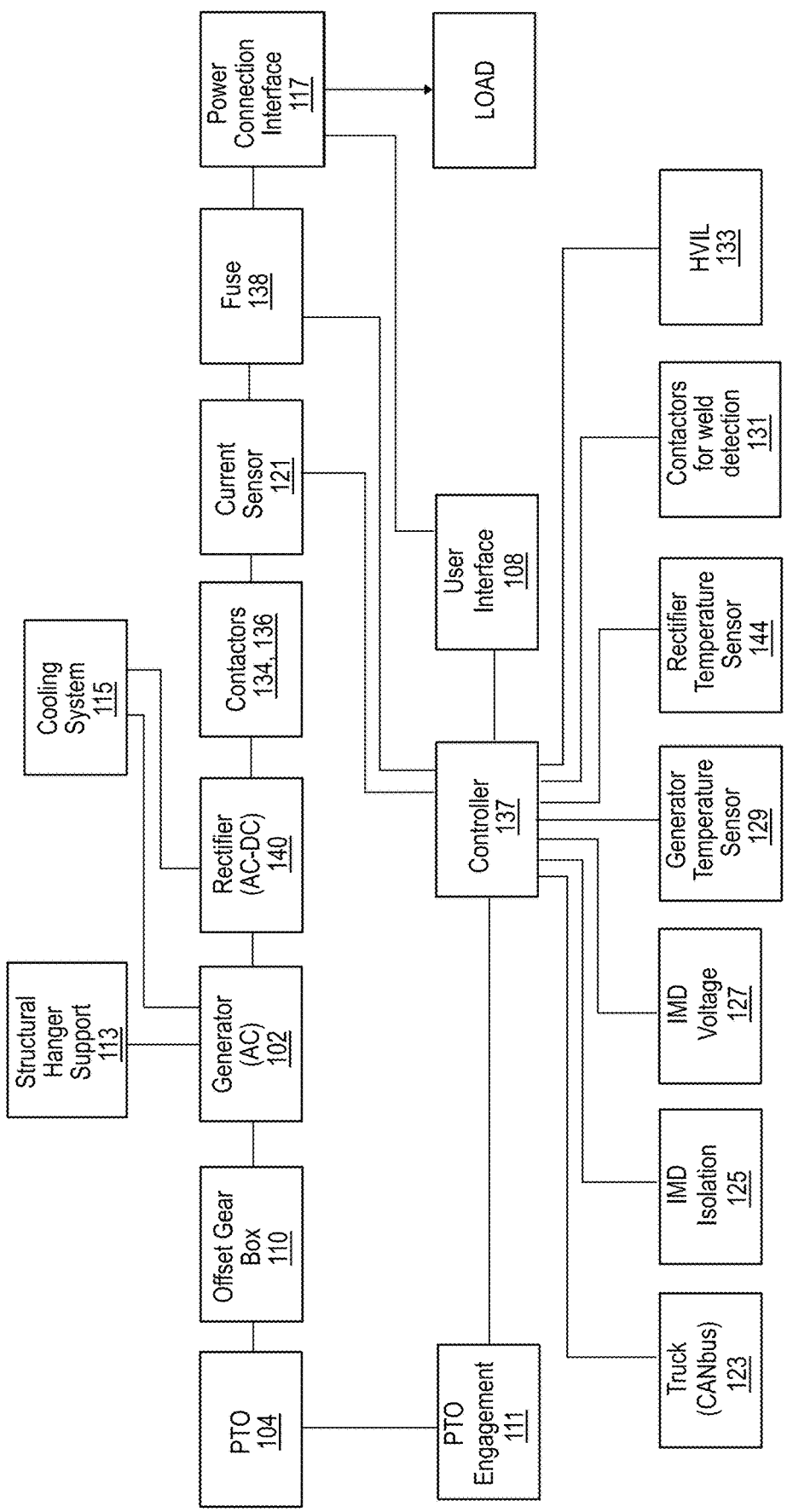
FIG. 10 illustrates a block diagram for DC applications using a vehicle auxiliary power system.

The AC to DC rectifier 140 is configured to convert three phase AC power from the generator 102 to single phase DC power for use by auxiliary vehicle systems (e.g., tanker pump systems). Example diagrams are illustrated in FIGS. 9-10, which will be discussed later herein. Referring back to FIG. 8, one or more sealing plates 142A-B may be useful in securing a cover over the internal componentry (e.g., contactors 134, 136, fuse 138, rectifier 140, etc.) of the power electronics enclosure 112.

Additionally, the rectifier 140 may comprise a temperature sensor 144 to aid in ensuring that the power electronics enclosure 112 does not overheat. To aid in cooling, the power electronics enclosure 112 may further comprise a liquid-cooled plate 146, one or more liquid-cooling ports 148, and one or more liquid-cooling passages 150A-E. It will be appreciated that the liquid-cooled plate 146 thereby aids in dissipating heat from the rectifier 140 and other components. While liquid cooling is preferable, it will be appreciated that other methods of cooling may be used without departing herefrom, including heat sinks and forced air.

It will be appreciated that the internal componentry of the power electronics enclosure 112 may vary, depending on application. For example, FIG. 9 illustrates a diagram of a vehicle auxiliary power system 100 having a power electronics enclosure 112 coupled to a generator 102 for use with DC power applications without regeneration, wherein a plurality of cables 169A-C electrically couple the generator 102 to the rectifier 140, with the rectifier transmitting high-voltage negative DC power to the DC negative contactor 134 via cable 154, with a high-voltage output cable 156 exiting the power electronics enclosure 112. The rectifier 140 likewise outputs high-voltage positive DC power to a fuse 138 via cable 158, from the fuse 138 to the DC positive contactor 136 via cable 160, and exiting the power electronics enclosure 112 via cable 162. Liquid cooling lines 164A-C aid in ensuring optimal temperatures within the power electronics enclosure 112. A multi-conductor signal cable 166, which may be coupled to the ECU 137 or other controller, may be coupled to numerous devices/signals, including a 5v thermistor supply, a generator thermistor signal, a high-voltage positive pre-charge, a negative contactor signal, 12 v to DC contactors, a positive contactor signal, a high-voltage negative reference, a rectifier thermistor signal, and a cable shield.

FIG. 10 illustrates a block diagram of a vehicle auxiliary power system 100 for generating and using direct DC power without regeneration or a battery. As shown, the PTO 104 is coupled to the offset gearbox 110 and PTO engagement 111. The PTO engagement 111 is coupled to a controller (e.g., ECU 137) so that the PTO engagement 111 may be selectively engaged/disengaged via the controller 137. The offset gearbox 110 is coupled to the generator 102, which is coupled to a structural hanger support 113. AC power is transmitted from the generator 102 to a rectifier 140 for converting the AC to DC. Both the generator 102 and rectifier may be cooled using a cooling system 115, which may comprise the liquid-cooled plate 146, one or more liquid-cooling ports 148, one or more liquid-cooling passages 150A-E, and liquid cooling lines 164A-C as described earlier. The rectifier 140 transmits DC power to the contactors 134, 136, which may then transmit DC power to a power connection interface 117 (e.g., female electrical receptacle) where it can be provided to a load 119. It will be appreciated that one or more safety devices may be implemented between the contactors 134, 136 and the power connection interface 117, such as a current sensor 121 and fuse 138 or other circuit breaker device. The controller 137 may be coupled to a plurality of devices to thereby monitor and control the status of the system. For example, the controller 137 may be coupled to the current sensor 121 and fuse 138, to the vehicle 106 through the CANbus port 123, to an Insulation Monitoring Device (IMD) monitoring isolation 125, to an IMD monitoring voltage 127, to a generator temperature sensor 129, a rectifier temperature sensor 144, one or more contacts or contact sensors 131 to detect welded contacts, a high voltage interlock loop (HVIL) 133, and a user interface 108. As discussed earlier, the user interface 108 is configured to display the on/off status of components, sensor readings, charge status, etc., while also allowing a user to control various functions by inputting into the user interface 108.

Figure 11:
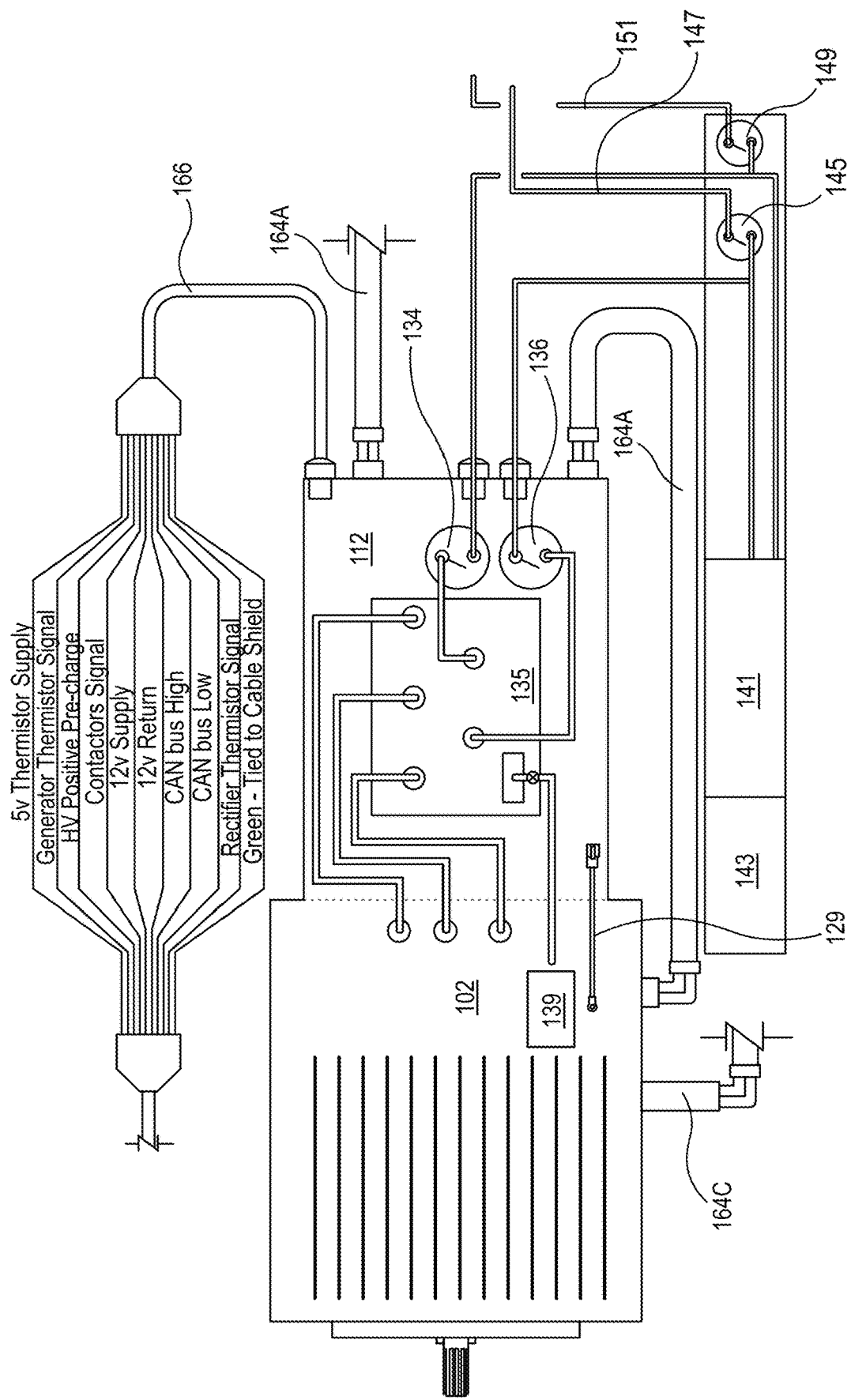
FIG. 11 illustrates a wiring diagram for DC applications with regeneration using a vehicle auxiliary power system.

FIG. 11 illustrates, in some embodiments, a diagram of a power electronics enclosure 112 coupled to a generator 102 for use with DC power applications including regeneration. As shown, the plurality of cables 169A-C transmit AC power from the generator 102 to a controller 135 (e.g., DANA Model #AC-X144) or other rectifier/inverter. The generator 102 may also comprise a generator encoder 139 that is likewise coupled to the controller 135. DC power is then transmitted to the respective DC negative contactor 134 and positive contactor 136. The DC positive contactor 136 is then coupled to a battery management system 141 which is coupled to one or more batteries 143, and to a second positive contactor 145. A high voltage positive DC power 147 cable may then be supplied to a power interface device. Likewise, DC negative contactor 134 is then coupled to a battery management system 141, which is coupled to one or more batteries 143, and to a second negative contactor 149. A high voltage negative DC power cable 151 may then be supplied to a power interface device. As in the previous embodiment, liquid cooling lines 164A-C may be used to cool the generator 102 and power electronics enclosure 112, and a multiconductor signal cable may also be present.

Figure 12:
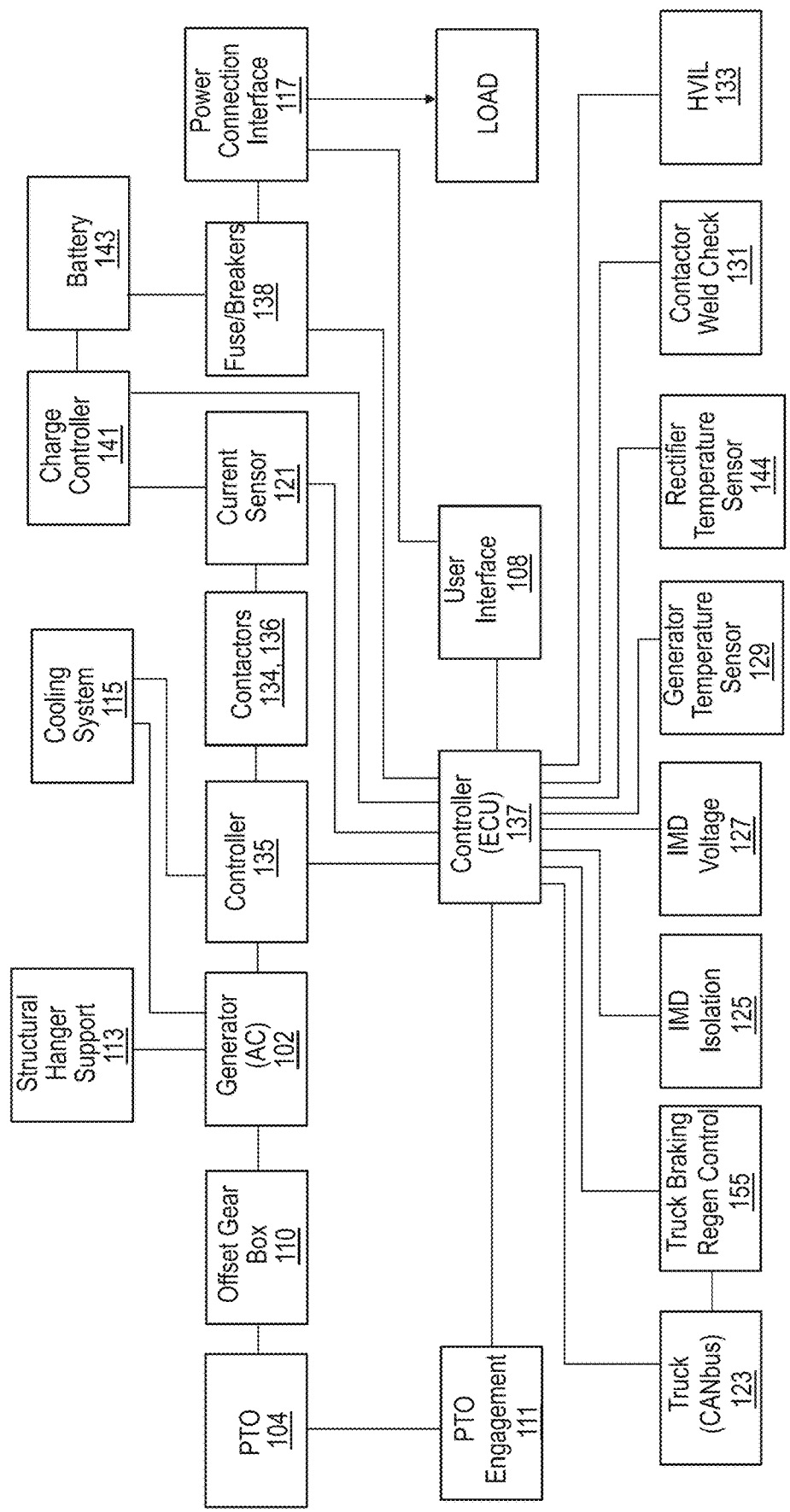
FIG. 12 illustrates a block diagram for DC applications with regeneration using a vehicle auxiliary power system.

Referring to FIG. 12, illustrates a block diagram of a vehicle auxiliary power system 100 comprising batteries and regeneration. As shown, the PTO 104 is coupled to the offset gearbox 110 and PTO engagement 111. The PTO engagement 111 is coupled to a controller (e.g., ECU 137) so that the PTO engagement 111 may be selectively engaged/disengaged via the controller 137. The offset gearbox 110 is coupled to the generator 102, which is coupled to a structural hanger support 113. AC power is transmitted from the generator 102 to controller 135 (e.g., AC-X144, or other controller capable of converting AC to DC or inverting DC to AC). Both the generator 102 and controller 135 may be cooled using a cooling system 115, which may comprise the liquid-cooled plate 146, one or more liquid-cooling ports 148, one or more liquid-cooling passages 150A-E, and liquid cooling lines 164A-C, as described earlier.

The controller 135 transmits power to the contactors 134, 136, to a charge controller (e.g., battery management system 141), to one or more batteries 143, and to a power connection interface 117. It will be appreciated that one or more safety devices may be implemented between the contactors 134, 136 and the power connection interface 117, such as a current sensor 121 and fuse 138 or other circuit breaker device. The controller 137 may be coupled to a plurality of devices to thereby monitor and control the status of the system. For example, the controller 137 may be coupled to the current sensor 121 and fuse/breakers 138, to the vehicle 106 through the CANbus port 123, to an Insulation Monitoring Device (IMD) monitoring isolation 125, to an IMD monitoring voltage 127, to a generator temperature sensor 129, a rectifier temperature sensor 144, one or more contacts or contact sensors 131 to detect welded contacts, a high voltage interlock loop (HVIL) 133, trucking braking regenerative controller 155, and a user interface 108. As discussed earlier, the user interface 108 is configured to display the on/off status of components, sensor readings, charge status, etc., while also allowing a user to control various functions by inputting into the user interface 108.

Figure 13:
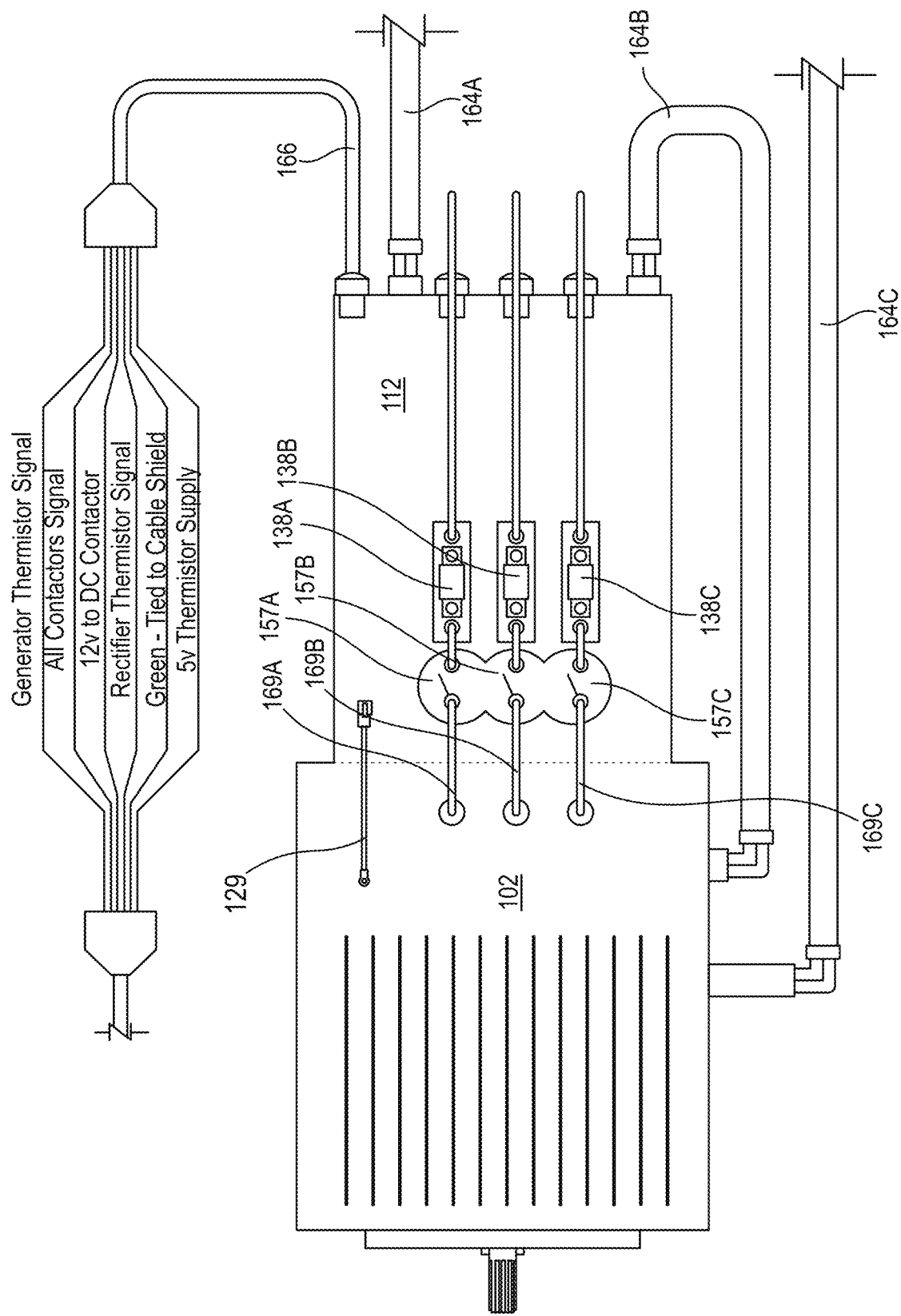
FIG. 13 illustrates a wiring diagram for AC applications using a vehicle auxiliary power system.
Figure 14:
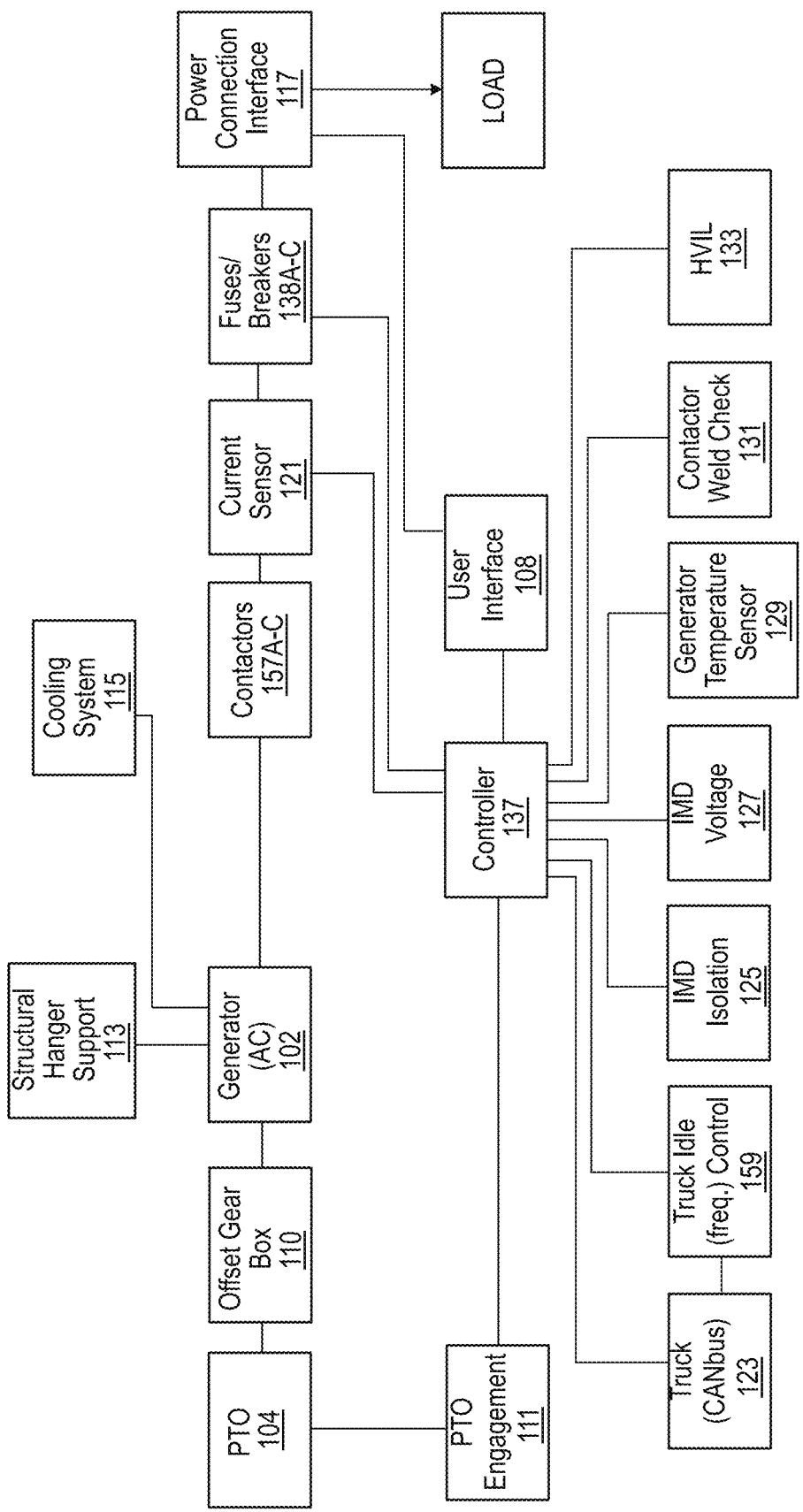
FIG. 14 illustrates a block diagram for AC applications using a vehicle auxiliary power system.

Referring to FIGS. 13-14, if the desired output is AC power, the rectifier may be omitted, and a third contactor would be provided (one for each phase of AC power). Each phase would have a fuse or circuit breaker as well. For example, FIG. 13 illustrates a diagram of a vehicle auxiliary power system 100 having a power electronics enclosure 112 coupled to a generator 102 for use with AC power applications, wherein a plurality of cables 169A-C electrically couple the generator 102 to a series of respective contactors 157A-C, with the contactors transmitting three-phase AC power to the power connection interface 117 after passing through respective fuses 138A-C. As in other embodiments, liquid cooling lines 164A-C aid in ensuring optimal temperatures within the power electronics enclosure 112. A multi-conductor signal cable 166, which may be coupled to the ECU 137 or other controller, may be coupled to numerous devices/signals, including a 5v thermistor supply, a generator thermistor signal, a high-voltage positive precharge, a negative contactor signal, 12 v to DC contactors, a positive contactor signal, a high-voltage negative reference, a rectifier thermistor signal, and a cable shield. The system may also comprise a generator temperature sensor 129 to ensure the temperature does not exceed a threshold for operating temperatures.

FIG. 14 illustrates a block diagram of a vehicle auxiliary power system 100 for use in AC power generation. As shown, the PTO 104 is coupled to the offset gearbox 110 and PTO engagement 111. The PTO engagement 111 is coupled to a controller (e.g., ECU 137) so that the PTO engagement 111 may be selectively engaged/disengaged via the controller 137. The offset gearbox 110 is coupled to the generator 102, which is coupled to a structural hanger support 113. AC power is transmitted from the generator 102 to a series of contactors 157A-C. The generator 102 may be cooled using a cooling system 115, which may comprise the liquid-cooled plate 146, one or more liquid-cooling ports 148, one or more liquid-cooling passages 150A-E, and liquid cooling lines 164A-C, as described earlier. It will be appreciated that one or more safety devices may be implemented between the contactors 157A-C and the power connection interface 117, such as a current sensor 121 and fuse/breakers 138A-C or other circuit breaker device. The controller 137 may be coupled to a plurality of devices to thereby monitor and control the status of the system. For example, the controller 137 may be coupled to the current sensor 121 and fuse/breakers 138A-C, to the vehicle 106 through the CANbus port 123, to an Insulation Monitoring Device (IMD) monitoring isolation 125, to an IMD monitoring voltage 127, to a generator temperature sensor 129, one or more contacts or contact sensors 131 to detect welded contacts, a high voltage interlock loop (HVIL) 133, truck idle controller 159, and a user interface 108. As discussed earlier, the user interface 108 is configured to display the on/off status of components, sensor readings, charge status, etc., while also allowing a user to control various functions by inputting into the user interface 108.

Figure 15A:
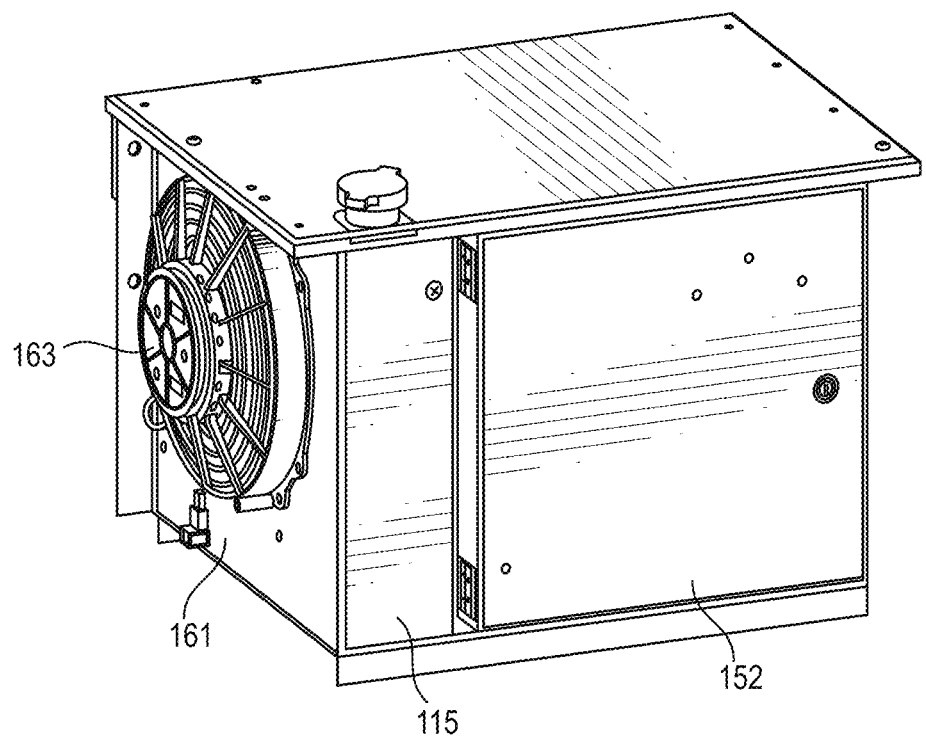
FIG. 15A illustrates a cooling system and control system of a vehicle auxiliary power system.
Figure 15B:
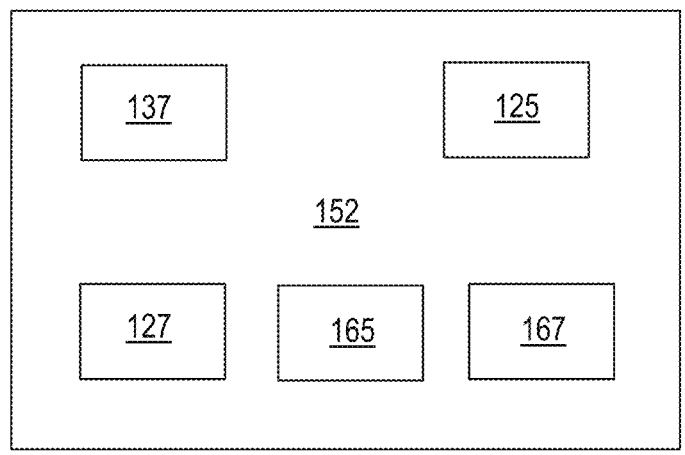
FIG. 15B illustrates a block diagram of a control system of a vehicle auxiliary power system.

FIG. 15A illustrates a cooling system 115 of the vehicle auxiliary power system 100, which may comprise a radiator 161, a fan 163, and coolant pump (not visible). It will be appreciated that this cooling system 115 may aid in cooling both the power electronics enclosure 112 and the generator 102, as discussed earlier. However, it will also be appreciated that, in some embodiments, the generator 102 may have a separate cooling system or may be cooled via the vehicle's radiator system. As shown, the cooling system 115 may be integrated in the same housing as a control system 152, although they may also be separated. As shown in FIG. 15B, the control system 152 may include at least one industrial vehicle node electronic control unit (ECU) 137, at least one Insulation Monitoring Device (IMD) 125, 127, an interlock door switch 165, an emergency stop button 167, and all peripheral relays, wires, and I/O blocks.

It will be appreciated that the IMD is used to detect voltage leaks on floating ground systems to a chassis or other separate ground that could pose a safety risk. The IMD introduces signals into the high voltage positive line and the high voltage negative line and looks for those signals to show up in the earth or chassis ground, indicating a flaw in the insulation that is allowing voltage to leak out. As a result, it is capable of detecting very small cracks or cuts in the high voltage wire insulation and communicating a system stop when a flaw or fault is detected.

Figure 16:
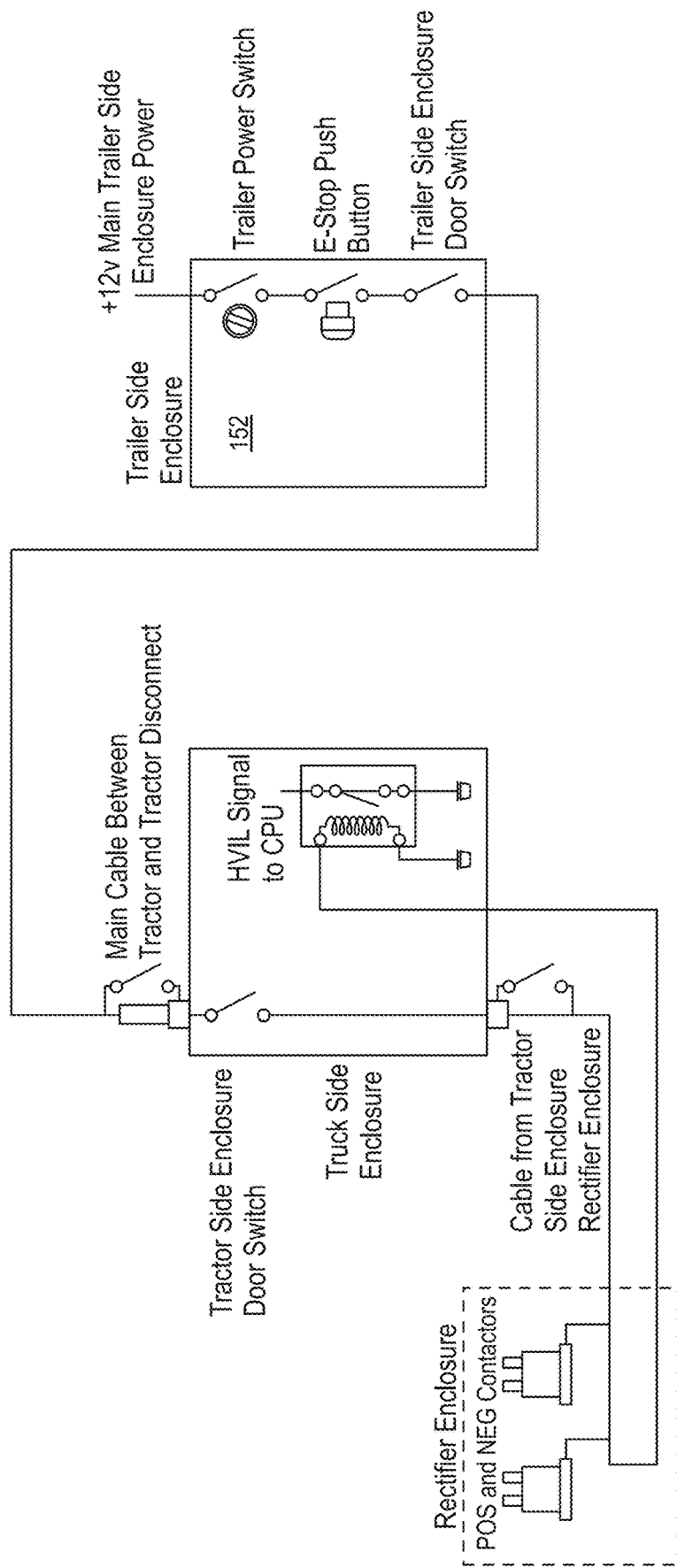
FIG. 16 illustrates a schematic of a high voltage interlock loop of a vehicle auxiliary power system.

With reference to FIG. 16, the vehicle auxiliary power system 100 may further comprise a high voltage interlock loop (HVIL) 133 to power the main power contactors and to indicate an open door, emergency stop button, or disconnected cable. For example, a 12v signal 168 originates in the control system 152 (which may be located on a trailer) and passes through any door interlock switches or emergency stop buttons. The 12v signal then provides power to the contactors (e.g., 134, 136) for the main high voltage positive and high voltage negative lines. This creates a hard-wired (i.e., not ECU controlled) safety circuit. The 12v signal also passes to the ECU 137 (or other CPU or processor), which will detect when the 12v power is dropped and provide the appropriate fault code. While contactors are discussed, it will be appreciated that other relays or mechanisms (e.g., solenoid) may be used.

In some embodiments, both AC and DC power may be available from the vehicle auxiliary power system 100. For example, for a PTO that is continuously engaged, the generator 102 may send AC power to the power electronics enclosure 112. If an AC load is not connected, the ECU 137 may utilize the rectifier 140 to convert the AC to DC, where it may then be used to charge one or more auxiliary batteries 143. Once the auxiliary batteries 143 are above a predetermined threshold, power may then be diverted to other components (e.g., climate control) to increase fuel efficiency. It will be appreciated that additional controllers, such as a battery management system 141, may be used without departing herefrom. It will also be appreciated that any auxiliary batteries 143 may also receive a charge from other sources, such as solar panels or through grid power using an electrical outlet and plug (e.g., 220 Volts). In such embodiments, energy stored in the auxiliary batteries 143 may significantly increase the fuel economy of the vehicle by utilizing that energy for driver comforts, mechanical energy through the generator 102 back to the PTO 104, or to run a motor without need for the vehicle engine to run. Accordingly, it will be understood from the foregoing that the vehicle auxiliary power system 100 disclosed herein may be used when the vehicle is either stationary (to provide power to auxiliary systems, for example) or moving (to charge auxiliary batteries or for other vehicle power systems, for example).

Figure 17:
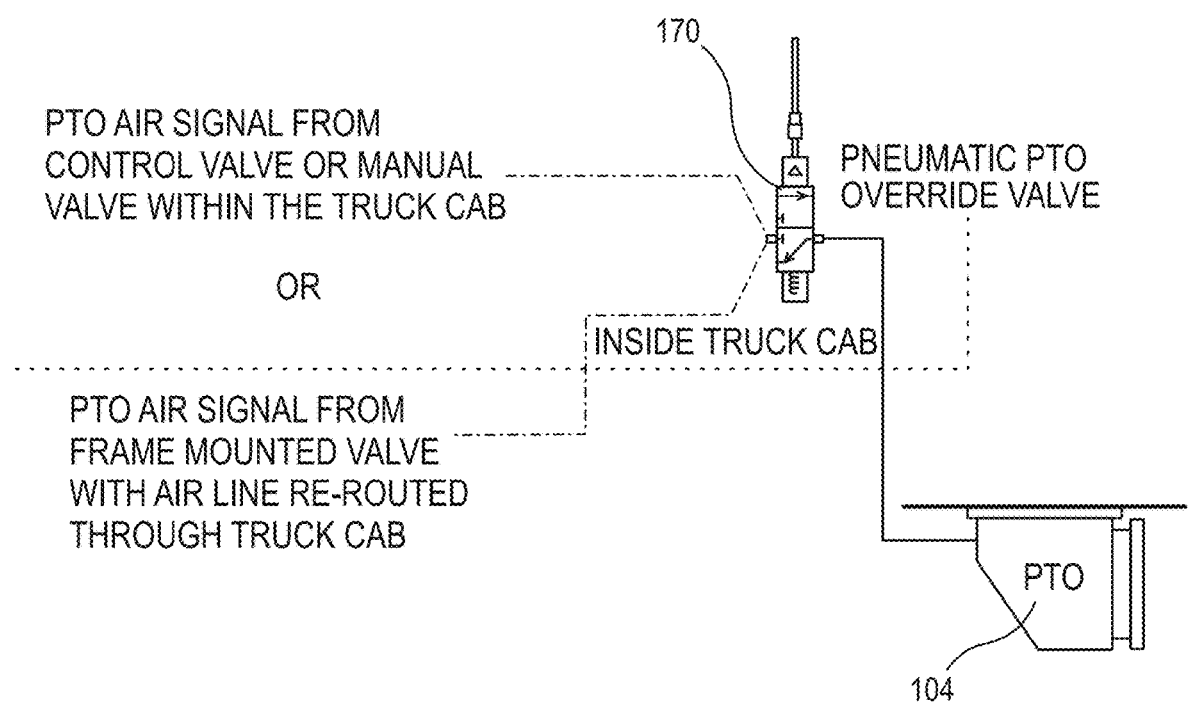
FIG. 17 illustrates an interlock device as part of a vehicle auxiliary power system.

As mentioned earlier herein, and now with reference to FIG. 17, as a further safety feature in some embodiments, the vehicle power system 100 may further comprise an interlock device 170, such as a pneumatic valve (for use with a pneumatically engaged PTO) or a relay (for an electrically engaged PTO). In either scenario, the interlock device 170 is configured to immediately disengage the PTO 104 and cut the circuit of the generator 102 and production of high voltage, thereby overriding any other commands from other controllers or systems.

In some embodiments, the ECU 137 or other controller may monitor power generation and direct power to the applicable power connection interface 117 (e.g., 220v AC outlet) or to a battery or battery bank 143 (DC power) for charging the battery(ies) 143, as preconfigured by a user. The ECU 137 or other computing system may be configured for input, monitoring, communication, sensing, notification, and/or safety functionalities that may protect the system components and/or increase control by administrators. In some embodiments, the ECU 137 or computing system selectively activates or deactivates one or more components (e.g., PTO, generator, rectifier, etc.) of the system in response to a triggering event, such as receiving user input (e.g., locally or from an administrative computing system) or detecting a sensor reading that meets or exceeds a predetermined threshold or is outside of a predefined acceptable range. The ECU 137 may be coupled to a vehicle power source (e.g., alternator) or battery so that when the PTO 104 is otherwise disengaged, the ECU 137 continues to operate and monitor various components in the system, and may likewise be used to activate or deactivate the generator 102 and associated components.

While the vehicle auxiliary power system 100 disclosed herein uses a PTO-driven system, it will be appreciated that a PTO is not required and other methods of capturing power from an engine may be utilized. For example, it is contemplated that in place of a PTO, the following may be used:

Direct integration into the casting and frame of a vehicle transmission;

Direct integration into the casting and frame of a vehicle internal combustion engine;

Direct belt drive off an internal combustion engine output shaft; or

Direct shaft input off a vehicle's drivetrain.

ECUs and other controllers or computing systems have been described herein. In its most basic configuration, a computing system includes a processor and a computer-readable hardware storage medium that may hold computer-executable instructions for execution by the processor. The processor and the computer-readable medium may be combined, such as by using a microcontroller. A computing system may also include (or are in wired or wireless communication with) a user interface, such as a controller with one or more input triggers (e.g., buttons, touch screen(s), etc.). In some implementations, the computing system(s) is (are) in communication (via a wired or wireless connection) with one or more user interfaces for communicating information to a user and/or receiving user input.

In some embodiments, as noted earlier herein, the ECU 137 may comprise a CANbus port 123 to connect with the vehicle operating/computing systems. In this regard, the ECU 137 (or a computing system associated therewith) may allow for computer control of the generator 102 and/or other portions of the vehicle auxiliary power system 100.

Further, the ECU 137 or computing system may also include communication channels allowing the ECU 137 or computing system to be in wireless (e.g., Bluetooth®, Wi-Fi®, satellite, infrared, etc.) or wired communication with any number or combination of sensors, networks, and/or other remote systems/devices. Remote systems/devices may be configured to perform any of the processing described with regard to computing system. By way of example, a remote system may include an administrative system that defines operation constraints for the vehicle auxiliary power system 100, receives sensor readings from the sensors (e.g., current sensor, temperature sensor, etc.), and/or issues commands to selectively deactivate the motor/generator that is in communication with the computing system/ECU.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

In some embodiments, the computing system includes computer-executable instructions (e.g., stored on storage) that enable the computing system (e.g., by one or more processors executing the computer-executable instructions) to selectively activate or deactivate any portion of the vehicle auxiliary power system 100, such as the generator 102, the PTO 104, etc. In some instances, the computing system selectively deactivates at least one component of the vehicle auxiliary power system 100 in response to a triggering event. In some instances, the triggering event is detecting that a sensor reading (e.g., current sensor, temperature sensor, etc.) of one or more sensors has met or exceeded a predetermined threshold value or is outside of a predetermined acceptable range.

For example, the computing system may selectively deactivate a component of the vehicle auxiliary power system 100 in response to determining that the generator 102 or rectifier 140 temperature has exceeded a predefined safe operation temperature. In other instances, the system may selectively deactivate a component of the vehicle auxiliary power system 100 in response to determining that the RPM of the generator 102 is too high.

Furthermore, the computing system may cause sensor values detected by the various sensors (e.g., current sensor, temperature sensor, etc.) in communication with the computing system to be displayed on a user display or user interface 108 (e.g., an I/O interface and/or a display of a remote system/device). For example, sensor readings may be displayed on a display of a user/administrator interface associated with the computing system. The computing system may display generator status, current RPMs, current, load amps of the generator, temperature of the generator 102 and inside the power electronics enclosure 112, among others. The input may include various input buttons (i.e., "AUTO", "ON", "OFF") for triggering selective activation/deactivation of the generator 102. The computing system may also include a notifier that indicates when the oil level of the offset gearbox 110 has reached an unacceptably low level, according to the applicable sensor reading. Displaying combinations of sensor readings to a user/administrator may make it easier for a user/administrator to ensure that the vehicle auxiliary power system 100 is operated with due care, so as to avoid damage caused by improper operation thereof.

Accordingly, it will be appreciated from the foregoing that the vehicle auxiliary power system 100 disclosed herein solves the need for a system of generating auxiliary power that is not limited by the vehicle alternator or battery and that does not require a separate engine, among other advantages.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A vehicle auxiliary power system, comprising:
a generator configured to couple to an internal combustion engine, the generator generating alternating current (AC) power;

a power electronics enclosure coupled to the generator, the power electronics enclosure configured to receive three phase AC power from the generator and comprising:
- i. a converter configured to convert the three phase AC power to direct current (DC) power; and
- ii. one or more DC contactors configured to open or close a power circuit based on one or more triggering events;

a power connection interface comprising at least one receptacle for distributing the DC power.

2. The vehicle auxiliary power system of claim 1, wherein the generator is coupled to an offset gearbox, the offset gearbox coupled to a power take-off (PTO), the PTO coupled to the internal combustion engine.

3. The vehicle auxiliary power system of claim 2, wherein the offset gearbox comprises a 1:2 gear ratio.

4. The vehicle auxiliary power system of claim 1, wherein the three phase AC power is coupled to a rectifier to convert the AC power to DC power, the DC power being outputted to:
- a. a high voltage negative cable and coupled to a negative contactor of the one or more contactors,
- b. a high voltage positive cable coupled to a fuse and then to a positive contactor of the one or more contactors;

wherein the DC power is then outputted to the power connection interface.

5. The vehicle auxiliary power system of claim 4, further comprising a rectifier temperature sensor and a generator temperature sensor.

6. The vehicle auxiliary power system of claim 1, further comprising a cooling system configured to cool the power electronics enclosure and the generator.

7. The vehicle auxiliary power system of claim 6, wherein the cooling system comprises a liquid-cooled plate comprising liquid-cooling passages, a plurality of liquid cooling lines coupled to the liquid-cooling passages, and a radiator with a fan.

8. The vehicle auxiliary power system of claim 1, further comprising a battery and a charge controller, wherein the DC power is transmitted from a first positive contactor and a first negative contactor of the one or more contactors, to the battery and charge controller and to a second positive contactor and a second negative contactor.

9. The vehicle auxiliary power system of claim 8, further comprising a generator encoder and a generator temperature sensor.

10. A vehicle auxiliary power system, comprising:
a generator configured to couple to an internal combustion engine;
a power electronics enclosure coupled to the generator, the power electronics enclosure configured to receive three phase alternating current (AC) power from the generator, the power electronics enclosure comprising:
- i. a contactor for each phase of AC power, and
- ii. a fuse or circuit breaker for each phase of AC power;

wherein the AC power is then provided to a power connection interface comprising at least one receptacle.

11. The vehicle auxiliary power system of claim 10, wherein the generator is coupled to an offset gearbox, the offset gearbox coupled to a power take-off (PTO), the PTO coupled to the internal combustion engine.

12. The vehicle auxiliary power system of claim 11, wherein the offset gearbox comprises a 1:2 gear ratio.

13. The vehicle auxiliary power system of claim 10, further comprising a multi-conductor signal cable.

14. The vehicle auxiliary power system of claim 10, further comprising a cooling system configured to cool the generator.

* * * * *